(12) United States Patent
Krimstock et al.

(10) Patent No.: US 6,735,299 B2
(45) Date of Patent: May 11, 2004

(54) AUTOMATIC CALL DISTRIBUTION GROUPS IN CALL CENTER MANAGEMENT SYSTEMS

(75) Inventors: Roger I. Krimstock, Boulder, CO (US); Robert T. Johns, Philadelphia, PA (US)

(73) Assignee: Avaya Technology Corp., Basking Ridge, NJ (US)

( * ) Notice: Subject to any disclaimer, the term of this patent is extended or adjusted under 35 U.S.C. 154(b) by 220 days.

(21) Appl. No.: 10/036,680

(22) Filed: Nov. 8, 2001

(65) Prior Publication Data
US 2003/0086554 A1 May 8, 2003

(51) Int. Cl.[7] ................................................. H04M 3/00
(52) U.S. Cl. ............................... 379/265.11; 379/265.02
(58) Field of Search ....................... 379/265.02, 265.09, 379/265.1, 265.11, 266.01, 266.04, 266.05

(56) References Cited

U.S. PATENT DOCUMENTS

| | | | |
|---|---|---|---|
| 4,737,983 A | 4/1988 | Frauenthal | 379/266.08 |
| 5,206,903 A * | 4/1993 | Kohler et al. | 379/265.12 |
| 5,335,268 A | 8/1994 | Kelly | 379/112.05 |
| 5,530,744 A | 6/1996 | Charalambous | 379/266.08 |
| 5,546,452 A | 8/1996 | Andrews | 379/219 |
| 5,594,902 A * | 1/1997 | Nishigaya et al. | 709/102 |
| 5,790,650 A | 8/1998 | Dunn et al. | 379/265.03 |
| 5,825,869 A | 10/1998 | Brooks | 379/265.12 |
| 5,915,012 A | 6/1999 | Miloslavsky | 379/265.02 |
| 5,926,538 A | 7/1999 | Deryngin et al. | 379/265.03 |
| 6,011,844 A | 1/2000 | Uppaluru | 379/220.01 |

OTHER PUBLICATIONS

U.S. patent application Ser. No. 09/264,497 filing date Mar. 8, 1999 Edwards.

* cited by examiner

Primary Examiner—Ahmad F. Matar
Assistant Examiner—Quynh H. Nguyen
(74) Attorney, Agent, or Firm—Sheridan Ross P.C.

(57) ABSTRACT

The present invention is directed to a multi-switch telecommunications system which propagates automatically entity changes for one switch group member to all members of the group and/or aggregates performance and other types of information for all members of a selected switch grouping.

55 Claims, 10 Drawing Sheets

ADDING THIS ENTITY TO THIS ACD GROUP IS NOT ALLOWED BECAUSE THE ENTITY HAS ALREADY BEEN DEFINED IN THE FOLLOWING OVERLAPPING ACD GROUPS. TO ADD THIS ENTITY, YOU MUST REMOVE IT FROM THE OVERLAPPING ACD GROUPS.

ENTITY ID: 10021

| ACD GROUP NUMBER | ACD GROUP NAME | ENTITY NAME |
|---|---|---|
| 27 | DIRECTORY ASST 0 | PETER FORSBERG |

PRESS RETURN TO CONTINUE:

FIG. 8

ADDING THIS ENTITY TO THIS ACD GROUP IS NOT ALLOWED BECAUSE THE NAME IS ALREADY IN USE WITHIN THIS ACD GROUP. PICK A NEW NAME OR RENAME THE CONFLICTING ENTITY.

ENTITY NAME: RAY BOURQUE

| ACD NO | ACD NAME | ENTITY ID |
|---|---|---|
| 1 | COMPINAS | 10001 |
| 2 | BARRA FUNDA | 10002 |
| 3 | SAO JOSE DON CAMPOS | 10003 |
| 4 | SOA BERNARDO DE CAMPO | 10004 |
| 5 | RIO DE JANERO | 10005 |
| 6 | BRAZILIA | 10006 |
| 7 | SAO PAULO | 10007 |
| 8 | PELE | 10008 |

PRESS RETURN TO CONTINUE:

FIG. 9

| ACD GROUP NAME | SPLIT / SKILLS | AGENT LOGIDS |
|---|---|---|
| DIRECTORY ASSISTANCE DENVER | 1 - 100 | 10000 - 12000 |
| DIRECTORY ASSISTANCE BOULDER | 101 - 200 | 12001 - 13000 |
| DIRECTORY ASSISTANCE PUEBLO | 201 - 300 | 13001 - 14000 |

FIG. 10

CALL CENTER ADMIN: ACD GROUPS: GET CONTENTS: LIST ALL ALL ACDS

ACD GROUP NAME: SERVICO SP

ACD NUMBER | ACD NAME
--- | ---
1 | CAMPINAS
2 | BARRA FUNDA
3 | SAO JOSE DOS CAMPOS
4 | SOA BERNARDO DE CAMPO

4 MATCHES FOUND: PERMITTED ONES DISPLAYED

FIG. 11

YOU CANNOT ADD THIS ACD TO THE ACD GROUP BECAUSE OF THE FOLLOWING ENTITY ID CONFLICTS WITH ACD GROUPS THAT ALREADY CONTAIN IT. TO ADD THIS ACD, YOU MUST RESOLVE THE ENTITY ID CONFLICTS AMONG THE ACD GROUPS.

| ACD GRP NO | ENTITY TYPE | ENTITY ID |
|---|---|---|
| 29 | SPLIT / SKILL | 10 |
| 30 | SPLIT / SKILL | 8 |
| 28 | AGENT | 5001 |
| 31 | AGENT | 5010 |

(SEE /USER/ELOG/AG_CONFLICTS FOR ADDITIONAL ITEMS)

PRESS RETURN TO CONTINUE:

FIG. 12

AUTOMATIC CALL DISTRIBUTION GROUPS IN CALL CENTER MANAGEMENT SYSTEMS

FIELD OF THE INVENTION

The present invention is directed generally to call centers and specifically to the administration of call centers having multiple telephony switches.

BACKGROUND OF THE INVENTION

Figure 1:
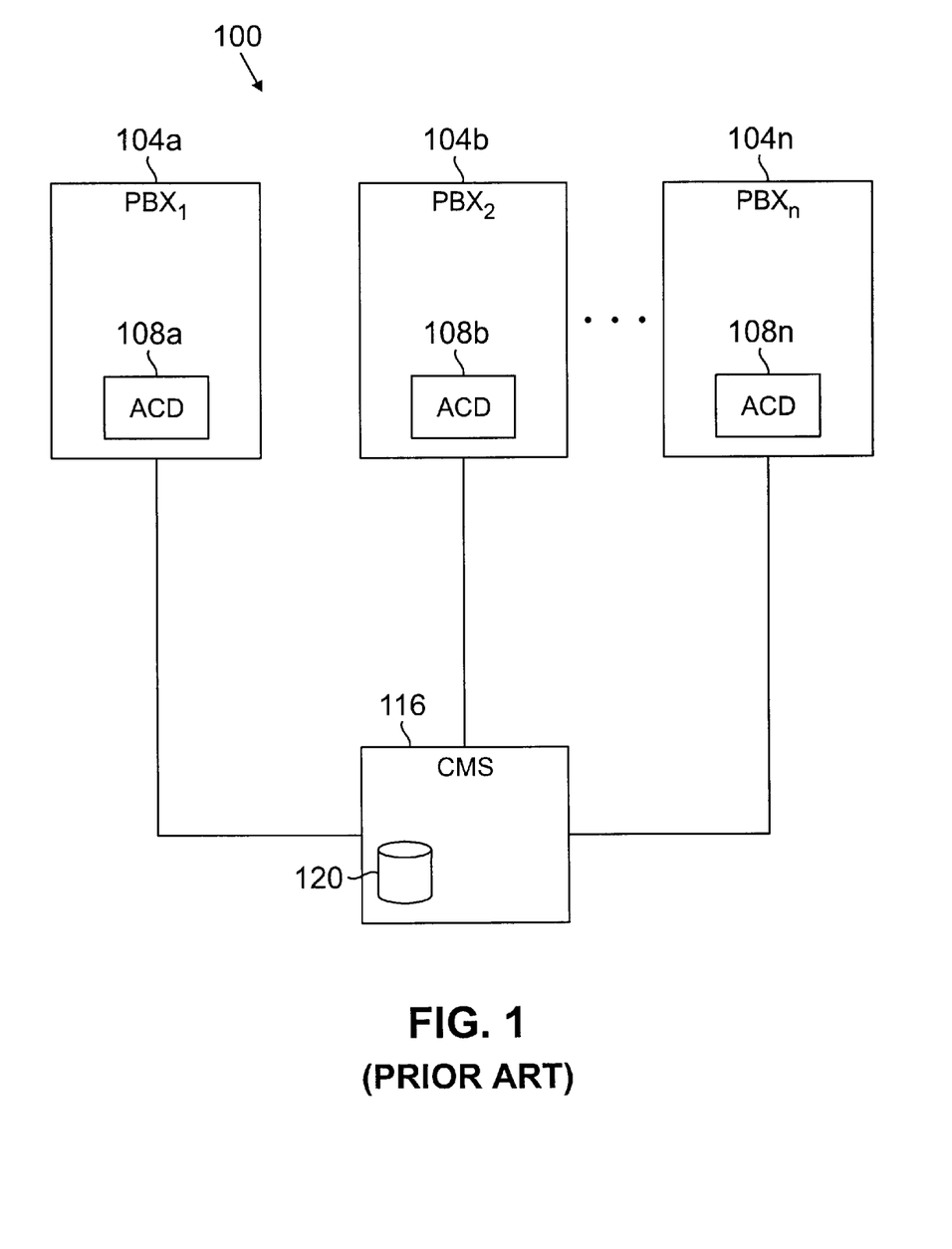
FIG. 1 depicts a multi-switch telephony system according to the prior art.

FIG. 1 depicts a conventional call center 100 comprising multiple telephony switches 104a–n, or private branch exchanges. Each switch 104a–n in the center 100 includes an automatic call distribution application (or ACD) 108a–n which further includes a router. As used herein, an ACD is software and/or hardware in a telephony switch that provides determined call center functionality, such as determining which skill is best for a selected contact, directing a contact in a queue for the respective switch to a desired agent, handling call prompting, and the like. Examples of ACDs include Definity™ sold by Avaya, Inc. and Magellan™ sold by Nortel. The router 112 manages call routing or load balancing among switches in multi-switch call centers based upon predetermined rules and/or policies, such as queue waiting times. An example of a router is Best Service Routing™ sold by Avaya, Inc. A call center management system or CMS 116 typically runs on an adjunct processor and collects information about each switch from the switch's corresponding ACD. The CMS enables call center administrators to monitor and manage call centers by generating reports on the statuses of agents, splits/skills, trunks, trunk groups, vectors and vector directory numbers or VDNs. An example of a CMS is Avaya CMS™ and of a toolset providing a graphical user interface for a CMS is Avaya CMS Supervisor™, both sold by Avaya Inc. The collected information is maintained in CMS database 120. As shown in FIG. 1, a single CMS typically serves multiple switches. Multi-switch call centers are gaining in popularity for call centers having agents in multiple geographical locations and for out-sourced call centers, whereby portions of an ACD or set of ACDs are leased to different clients with a concomitant need to enforce privacy and security.

Administration of multi-switch call centers can be labor intensive and therefore expensive. Currently, multi-switch call centers are managed by the CMS using a single-ACD administration and reporting model whose architecture was created for single-switch call centers. To avoid conflicts, agents are assigned to the same split/skill in each of the ACDs, i.e., agents are administered identically across the multiple ACDs. In adding an agent to the call center, for example, an administrator must add the agent separately to each ACD. Likewise in deleting an agent from the call center, the administrator must delete the agent separately from each ACD. Any inconsistency in agent names, login ids, and the like among the ACDs can cause system conflicts. Other synonym types (e.g., aux reason codes, logout reason codes, VDNs, vectors, etc.) require the same type of administration assistance. As will be appreciated, a synonym is a data structure that associates an entity name with an entity id; an entity is a measurable resource, such as an agent, a split/skill, a trunk, a trunk group, a VDN, and a vector; an entity id is an identifier (typically numerical) that corresponds to the entity; and an entity name is a name (e.g., a character string) that corresponds to an entity.

Further problems are encountered in aggregating collected information about the call center. Administrators must aggregate data across several reports when exploring activities across ACDs. For example, to monitor agent performance an administrator must individually generate a report on agent performance for each ACD and manually combine selected contents of the various reports to produce a report for the group of ACDs.

Further problems are encountered in enforcing privacy and security for personnel not only within a company owning a call center but also among multiple companies sharing portions of the call center. Privacy and security typically involve data structures known as permissions, which are rules, policies, or codes restricting CMS read and/or write access. Permissions, like synonyms, are periodically updated and, when updated, must be done for each ACD individually to avoid inconsistencies and system conflicts.

SUMMARY OF THE INVENTION

These and other needs are addressed by the various embodiments and configurations of the present invention. Generally, the present invention uses data structures corresponding to a group of switches to cause additions, modifications, and/or other types of queries to be executed for all members of the group.

In one embodiment, a telecommunications system includes at least:

(a) a plurality of telephony switches (e.g., any communication switches such as private branch exchanges or PBXs) that receive incoming contacts and route the contacts to a corresponding agent;

(b) a management system (e.g., CMS) that interfaces with the plurality of telephony switches and maintains for each of the plurality of telephony switches entity-related information (e.g., performance statistics, login ids, names, permissions, etc.) associated with at least one entity. At least two of the plurality of telephony switches define at least a first group of switches (e.g., an ACD group). The management system includes at least one of the following:

(i) a propagator that propagates automatically at least one of additions to, modifications of, and deletions of the entity information to each member of the first group of switches; and (ii) an aggregator that receives queries for the entity information for the first group of switches and retrieves automatically the entity information associated with each member of the first group of switches and/or with the first group of switches. In one configuration, an ACD attribute is used to distinguish whether an ACD is ungrouped or is a member of a group. As used herein, an "attribute" refers to a property of a communications switch, such as the feature expert agent selection set including vectoring and EAS™ sold by Avaya, Inc., and a switch grouping such as an ACD group.

By using the concept of the switch or ACD group, the management system can provide the dynamic ability to group switches and manage the resultant groups for a variety of entities. Call center supervisors can have transparent views of their agents regardless of which switch/ACD the agent is logged in to and consolidated agent, split/skill and agent group reporting that aggregates data from multiple ACDs. These capabilities can be provided for realtime and historical reporting, such as through the Centre Vu CMS™ or Centre Vu Supervisor™ ("CVS") interfaces of Avaya, Inc. The customer can view a group of switches as if the switches were a single, virtual switch. The switch group concept is extendible to any ACD resource or entity tracked by CMS, including vectors, VDNs, trunk groups, call work codes, split/skills, trunks, permissions, etc.

In one configuration, the telecommunications system includes a conflict checker that determines when a conflict exists between the addition to, modification of, and deletion of the entity information (which includes permissions) and existing entity information (which also includes permissions). The conflict checker typically first determines when a conflict exists between an entity identifier and/or an entity name and an existing entity identifier and/or entity name. When a conflict is identified by the conflict checker, the propagator does not automatically propagate the addition to, modification of, and deletion of the entity information. As part of the conflict check the management system typically determines when a switch is included in more than one group of switches. Although certain entity conflicts are only examined for certain entities and/or members of the group, other entity conflicts are also examined for members of overlapping groups.

In one configuration, the ACD Group must satisfy two axioms: (1) ACD resource or entity ids are unique among ACD Groups; and (2) entity names are unique within an ACD Group and its ACD members (at least at the time each member A(i) is added to the group). The ACD Group, then, is a set of ACDs in which the ACD resources or entities have been partitioned into "stripes" across the member ACDs. For example, agents 2000 through 2500 and split/skills 10 through 20 may be resources on ACD Group X, while agents 2501 through 3000 and split/skills 21 through 30 may be resources on ACD Group Y.

In one illustrative application, an ACD group administration screen is used to create and modify ACD groups. A name is chosen for the group and ACDs are added to it. The ACDs are rearranged at any time. When a new ACD is added to an existing ACD group, the full administration of the group is propagated to the ACD. The CMS administrator defines synonyms for entities (e.g., agents, split/skills, etc.) in an ACD group using the existing CMS dictionary screens, in much the same way as is currently done for a single (ungrouped) ACD. However the synonyms defined for entities in an ACD group are automatically propagated to each ACD in the group. In the same manner, propagation is also used to manage modification of the synonyms and permissions for the entire ACD group. Propagation of ACD administration in this manner is required to fully support "drill down" in CVS reports from the ACD Group level to the ACD level (synonyms are typically identical at the ACD group and ACD level). Therefore, reports are consistent at the ACD group level and the ACD level (and below). Entity conflict resolution (e.g., an agent or split is previously defined for another ACD group) is detected both when a new ACD is added to an ACD group and when a new agent or split is added to an ACD group. Entities within an ACD belong to only one ACD group.

As shown by the foregoing illustration, the ACD group is in effect a dynamic, virtual ACD that crosses the physical boundary of an ACD. Supervisors can run reports that automatically aggregate both real-time and historical data across any set of ACDs in a customer's call center network and present the data with a consistent set of synonyms. Agents that log in to any one of several ACDs can be tracked with a single report.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

An embodiment of the present invention provides a database-centric architecture that supports one or more of (i) a definition of ACD groups; (2) propagation of entity synonyms and/or permissions from an ACD group to its component ACDs; and (3) union and aggregation of data across ACD boundaries. Data can be retrieved for the entire group of ACDs and presented to system administrators in a consolidated format. As used herein, an ACD group is an administratively defined set of ACDs that serves as the scope of multi-ACD administration and reporting.

Figure 2:
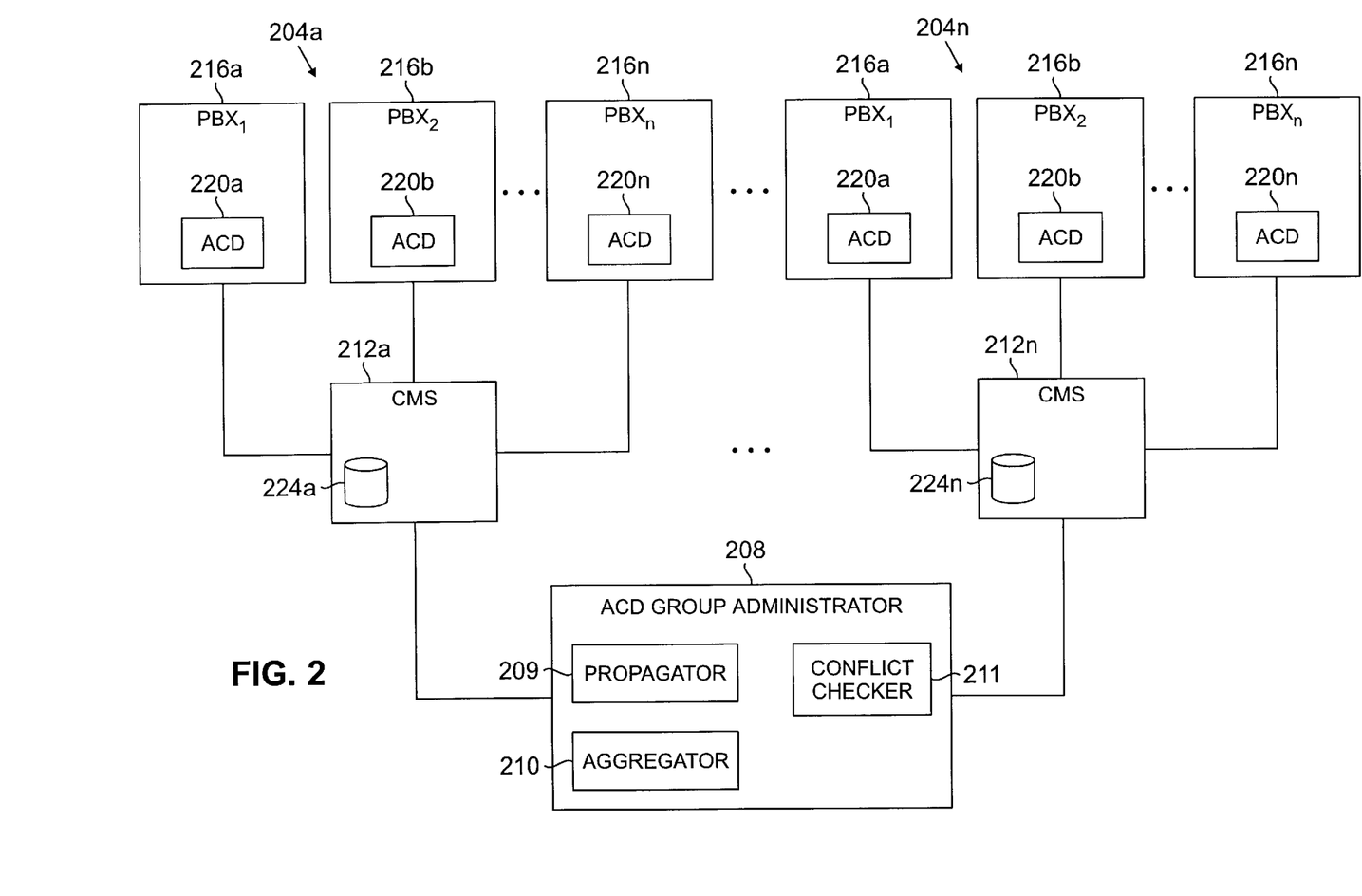
FIG. 2 depicts a multi-switch telephony system according to an embodiment of the present invention.

Referring to FIG. 2, an embodiment of a multi-switch call center 200 is depicted. A plurality of switch sets 204*a–n* are served simultaneously by an ACD group administrator 208. Each switch set 204*a–n* is served by a corresponding common CMS 212*a–n*. Each switch set includes a plurality of switches 216*a–n*, and each switch in the set includes a respective ACD 220*a–n*. Each CMS 212*a–n* includes a respective database 224*a–n* for collecting information associated with all of the switches in the CMS' corresponding switch set. As will be appreciated, each CMS can be a repository for information collected by another CMS relating to the other CMS' switch set, depending upon the application. As will be appreciated, ACD group administrator 208 can be contained in computational components adjunct to the CMS 212*a–n* and/or can be contained in one or more of or distributed among the CMS 212*a–n*, depending upon the application.

ACD group administrator 208 includes a number of applications. The propagator 209 propagates entity/permission additions, changes and deletions to all members of an ACD group. Conflict checker 211 determines when the requested changes, if made, will conflict with an existing entity/permission. The aggregator 210 collects information for all members of an ACD group in response to queries for such information.

ACD group administrator 208 typically alters the CMS databases to store a definition of an ACD group's component ACDs and contains CMS user ACD group permissions. Generally, each CMS database 224 includes one or more ACD dictionaries defining agent names, skills and agent groups, and names of agent group components for each ACD group and ACD member. Typically, the ACD dictionary contains information-containing fields corresponding to entities such as ACD group string, ACD group number, ACD group member string, ACD group member number, ACD group attribute, agent name, login id, agent group, split/skill string value, aux reason codes, logout reason codes, VDNs, vectors, permissions, trunk groups, location ids, and call work codes, etc. As will be appreciated, ACD group string and ACD group number typically form an id name pair of the ACD group. The databases 224 also further include an ACD group dictionary for each ACD group including ACD group definitions and associated information-containing fields corresponding to entities, such as agent, agent groups, split/skills, AUX reason codes, logout reason codes, VDNs, Vectors, etc. An ACD group can be the switches in switch set 204a or selected switches distributed among a plurality of switch sets. An example of the latter proposition would be to define an ACD group that includes switch 216a from switch set 204a and switch 216n from set 204n. The attributes of an ACD Group include this "striping" attribute that explicitly defines a range for each ACD resource in its domain, as well as the member ACD attribute that defines which of the component ACDs in a communications switching network belong to an ACD Group.

Figure 10:
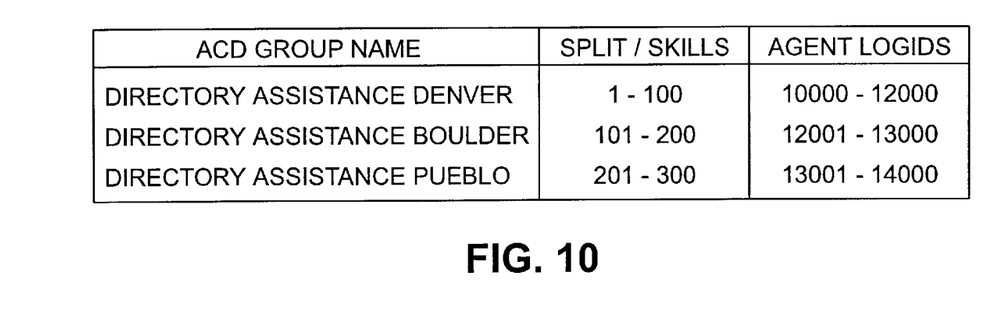
FIG. 10 depicts a definition of several ACD groups based on resources.

ACDs may be divided by resources in the ACD group. For example, FIG. 10 shows several ACD groups defined by assigning the ACD groups identical resources (i.e., split/skills and agent logids) across all component ACDs. In multi-site call centers, ACD groups can be defined across CMS boundaries.

Any number of ACDs can be in an ACD group. An ACD group does not serve as the CMS master ACD. In one configuration, CMS reserves ACD numbers 1 through 8 for ACDs that are physically connected to CMS and ACD numbers 9 through 26 for pseudo ACDs. ACD groups are assigned ACD numbers 27 through 38. ACD groups can overlap; that is, an ACD can be a member of multiple ACD groups. No pseudo-ACD can be a member of any ACD group.

Figure 3:
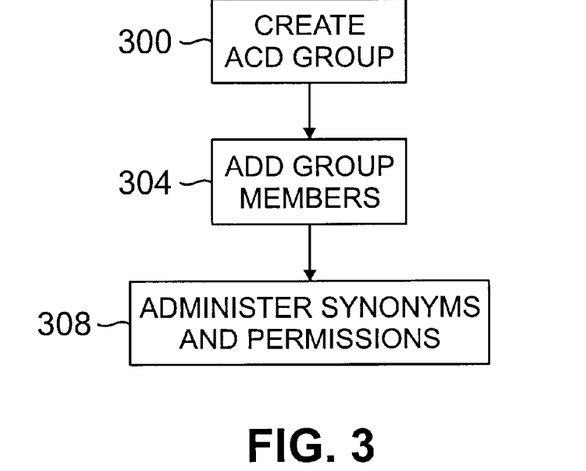
FIG. 3 is a flowchart of the method for creating an ACD group according to an embodiment of the present invention.

The steps for creating an ACD group are shown in FIG. 3. In step 300, the data structure for the ACD group (e.g., the ACD group synonym string and ACD group number fields) are initialized. In step 304, group members are added to the newly created ACD group and in step 308 synonyms and permissions administered as discussed below.

As will be appreciated, support for the overlapping of ACD groups opens the possibility that synonym conflict can occur when entity synonyms are propagated from an ACD group to the individual ACDs that are members of the group. To mitigate the risk of entity synonym conflict, the assignment of entities to an ACD group obeys the following axioms:

(1) Entity ID uniqueness. Entity ids in overlapping ACD groups are mutually exclusive. If two ACD groups overlap, no entity can belong to both ACD groups. For example, if ACD group A and ACD group B overlap, then split 100 cannot belong to both ACD group A and ACD group B.

(2) Entity name uniqueness. Entity synonym names are unique for an ACD group and across all of the ACDs that are members of the ACD group. For example, to assign a split with the synonym "sales" to ACD group A, the synonym cannot already exist for ACD group A or for any of the ACDs that are members of ACD group A.

Figure 7:
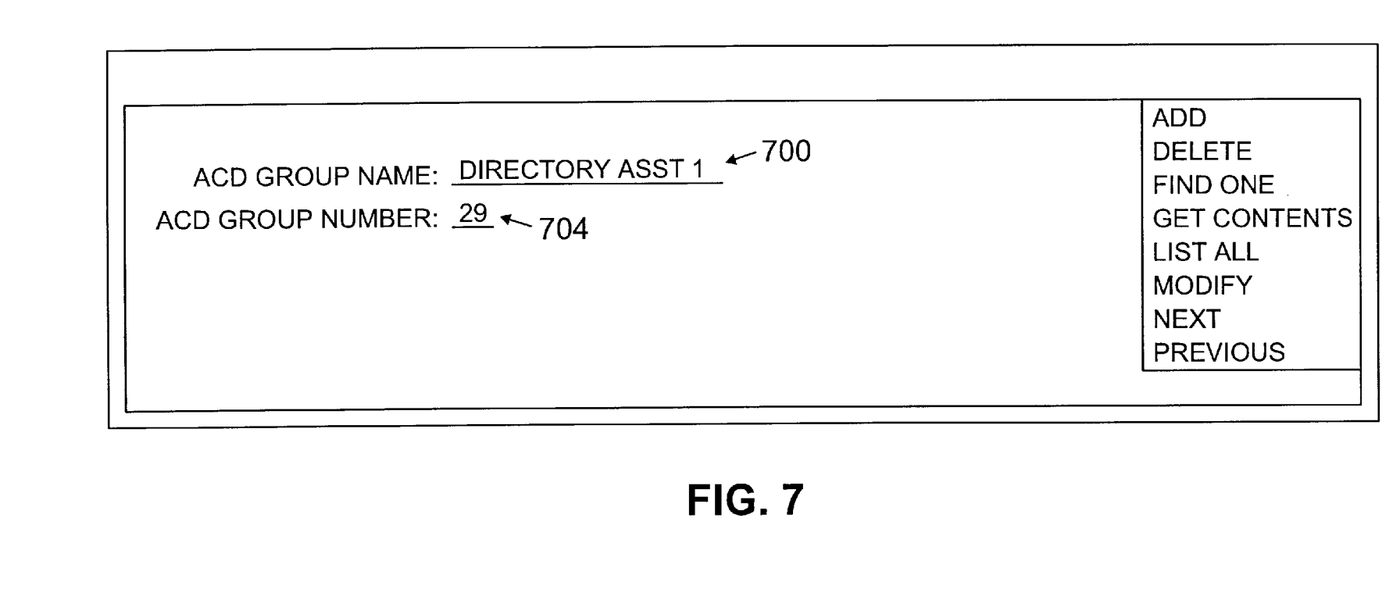
FIG. 7 depicts a graphical user interface according to an embodiment of the present invention.

A CMS administrator can have a number of options in reference to ACD groups, such as Get Contents (for selected ACD group), Add (new ACD to ACD group), Delete (existing ACD member from ACD group by removing from the CMS dictionary in database 224 the ACD group synonym record, the ACD group data collection administration record, all ACD group level entity synonyms defined for the group, all agent group members defined for the ACD group, the ACD group's records of member ACDs from the table of ACD group definitions, and all user permissions for access to the ACD group from the table of ACD group definitions), Modify (previously defined name of ACD group by editing the synonym field for the ACD group), List All (synonym strings and ACD group numbers of all of the ACD groups defined on a system), Find One (ACD group by searching for a selected synonym string or the occurrence of a selected character grouping in the name of an ACD group matching a substring, Previous (which searches for the lexicographically previous ACD group defined on a system by synonym string), and Next (which searches for the lexicographically next ACD group defined on a system by synonym string). An example of a graphical presentation for selecting these options is shown in FIG. 7. After an ACD group has been selected by inputting name, any of the commands can be chosen.

When Get Contents is selected, the user has the further option to Add an ACD to the selected ACD group, Delete an ACD from the selected ACD group, or List All of the ACDs that are members of the selected ACD group. When modifying the contents of an ACD group, a user specifies, one at a time, the ACDs that will be added to or removed from the group.

Figure 5:
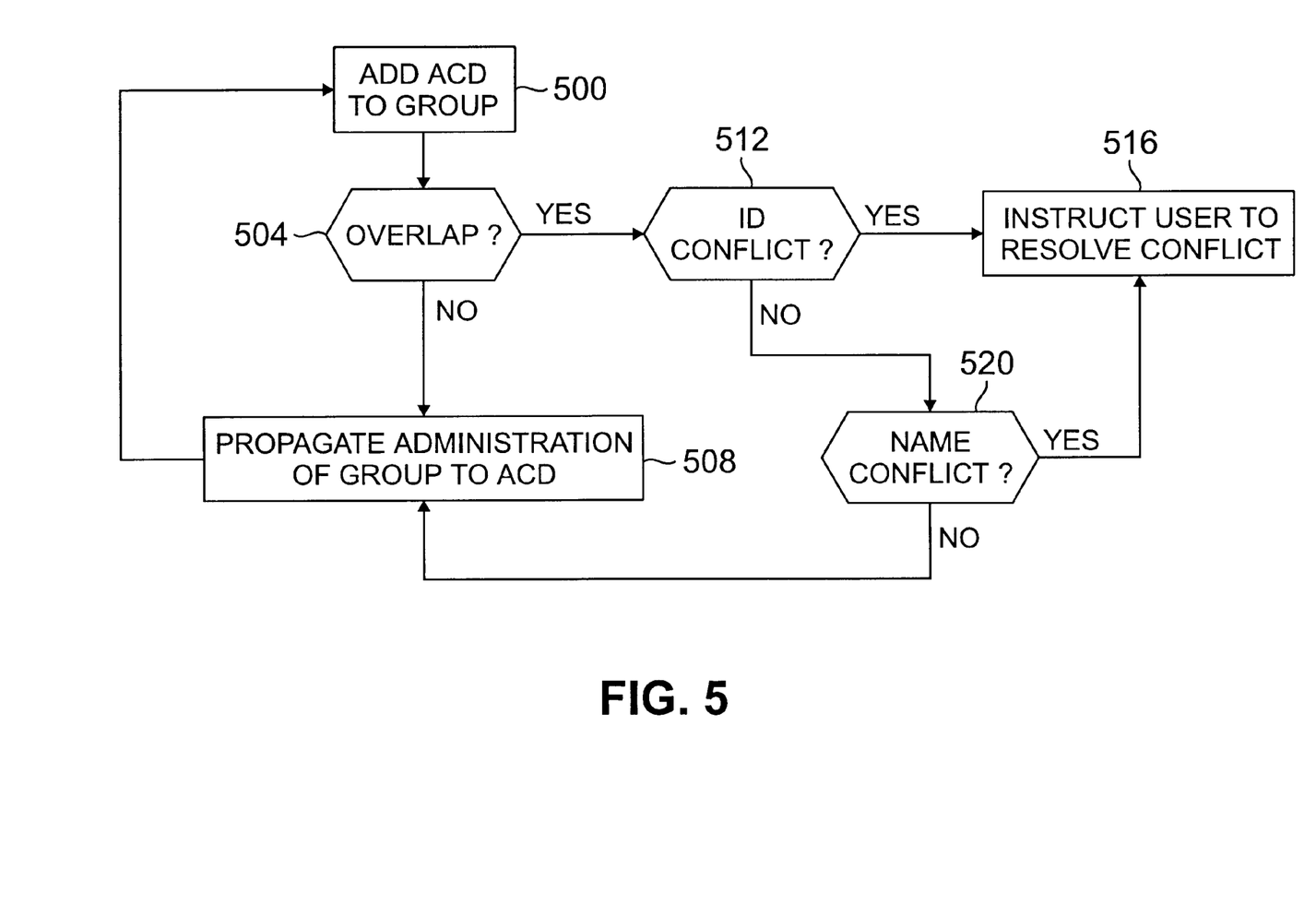
FIG. 5 is a flowchart of the method for adding an ACD to an existing ACD group according to an embodiment of the present invention.
Figure 12:
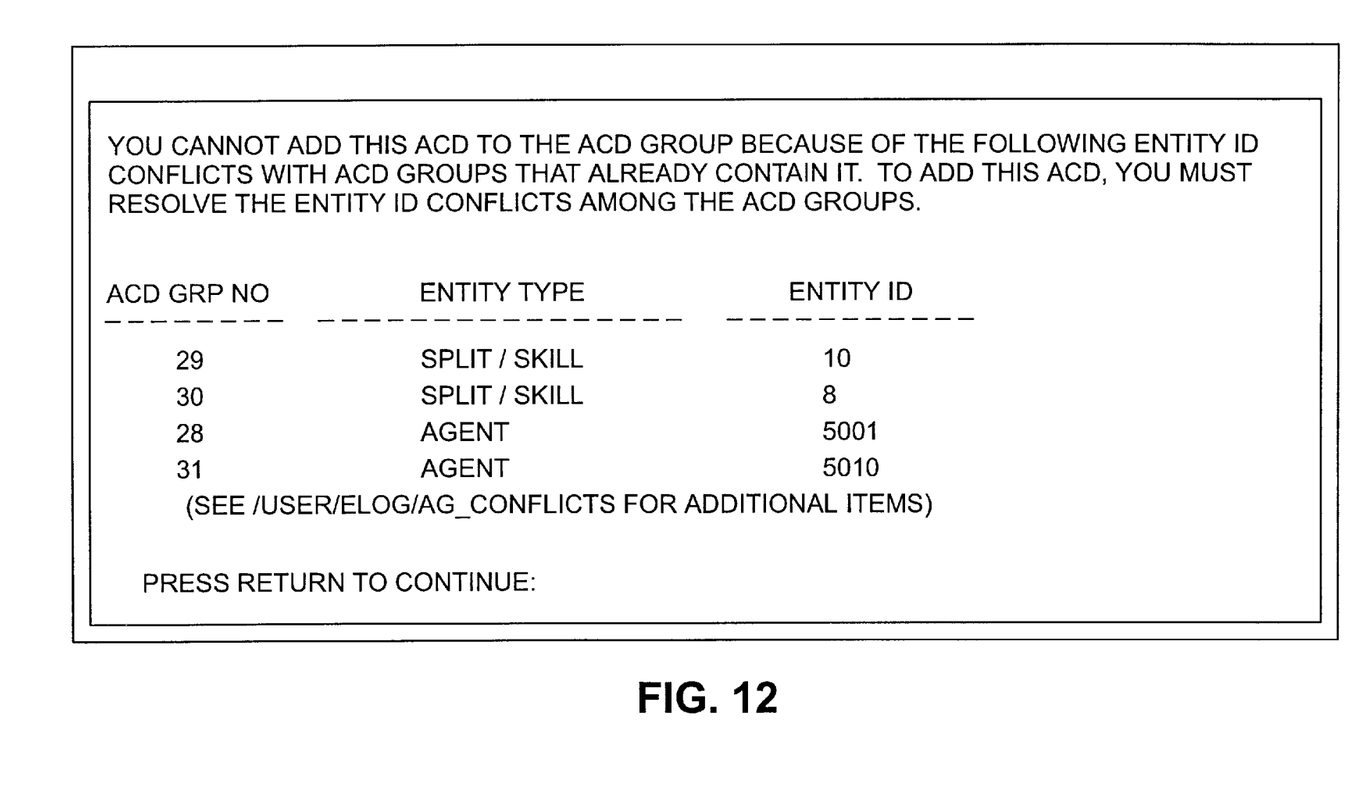
FIG. 12 depicts a graphical user interface according to an embodiment of the invention.

If the result of modifying an ACD group is to add a new ACD member to an ACD group, the algorithm of FIG. 5 is employed. Referring to FIG. 5, the ACD administrator first receives in step 500 the command to add an ACD to the selected ACD group as a new member. The administrator determines in step 504 whether the ACD to be added is currently also a member of another ACD group. If no overlap exists, the administrator proceeds to step 508 in which the data structures associated with the ACD group are propagated to the new member ACD. If an overlap exists, the administrator next determines in step 512 whether an id conflict exists across all overlapping ACD groups and all entities. In other words, the administrator determines whether any of the overlapping ACD groups already containing the new member have conflicting information across any of the ACD group attributes, e.g., log in id and other synonym types. This step mirrors the first axiom noted above. If a conflict is identified, the administrator in step 516 instructs the user to resolve the conflict by presenting to the user a graphical interface such as that shown in FIG. 12. If a conflict is not identified, the administrator proceeds to step 520 in which the administrator determines within the selected ACD group and among the same types of entities whether a name conflict exists. If so, the administrator in step 516 instructs the user to resolve the conflict by presenting to the user a graphical interface such as that shown in FIG. 12. If not, the administrator proceeds to step 508 and propagates the data structures associated with the selected ACD group to the newly added ACD. As will be appreciated, the same name (but not id) can be used in other overlapping ACD groups and/or for other entities (types) in the same ACD group but not in connection with the same entity (type) in the same ACD group.

If the result of modifying an ACD group is to remove an ACD from an ACD group, the user is presented with an option to delete existing entity synonyms defined for the ACD group from the ACD that was removed from the group. By default, existing entity synonyms defined for the ACD group are not deleted from the ACD that was removed from the group. Typically, conflict resolution is not required when deleting or removing an entity, permission, ACD, and/or attribute of a group.

Figure 11:
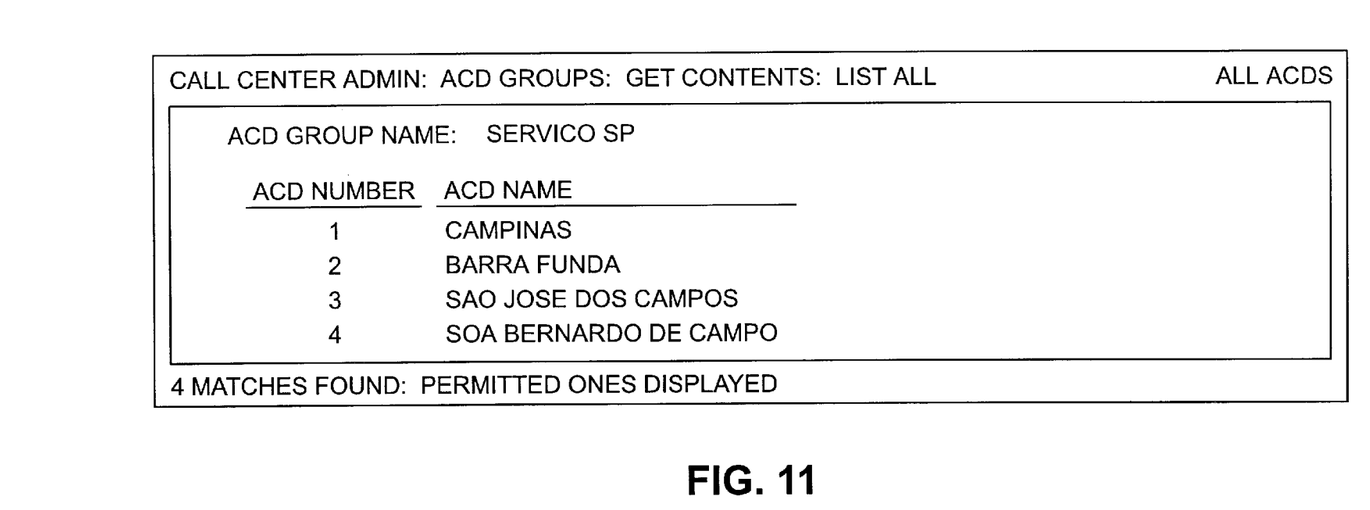
FIG. 11 depicts a graphical user interface according to an embodiment of the invention.

If the List All option is selected from the ACD groups: Get Contents screen, a list of ACDs that are members of the ACD group is displayed in a separate screen. Both the ACD synonym string and ACD group number are displayed. A sample display for the "list All" option is shown in FIG. 11.

Figure 4:
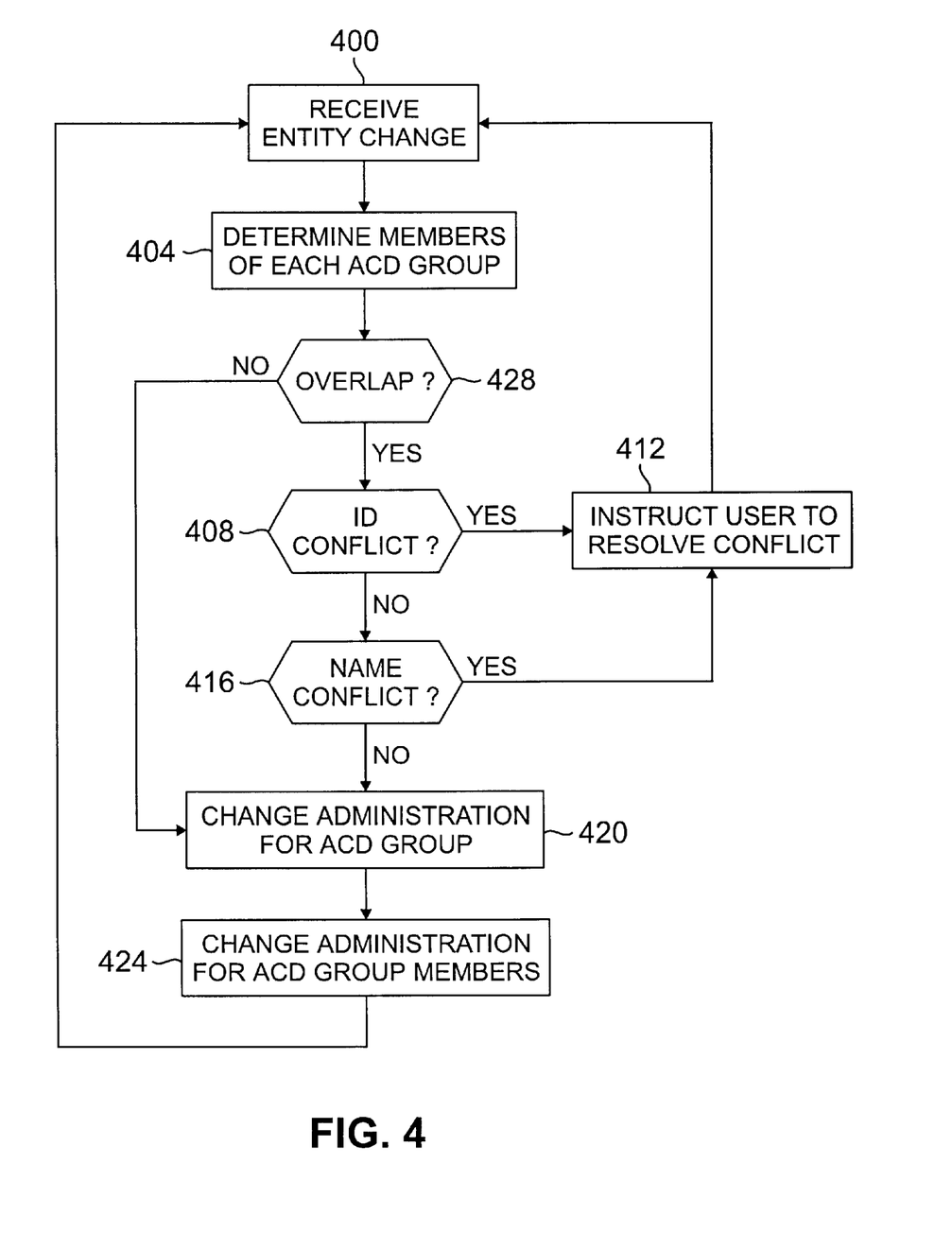
FIG. 4 is a flowchart of the method for effectuating entity or synonym changes across an ACD group according to an embodiment of the present invention.
Figure 8:
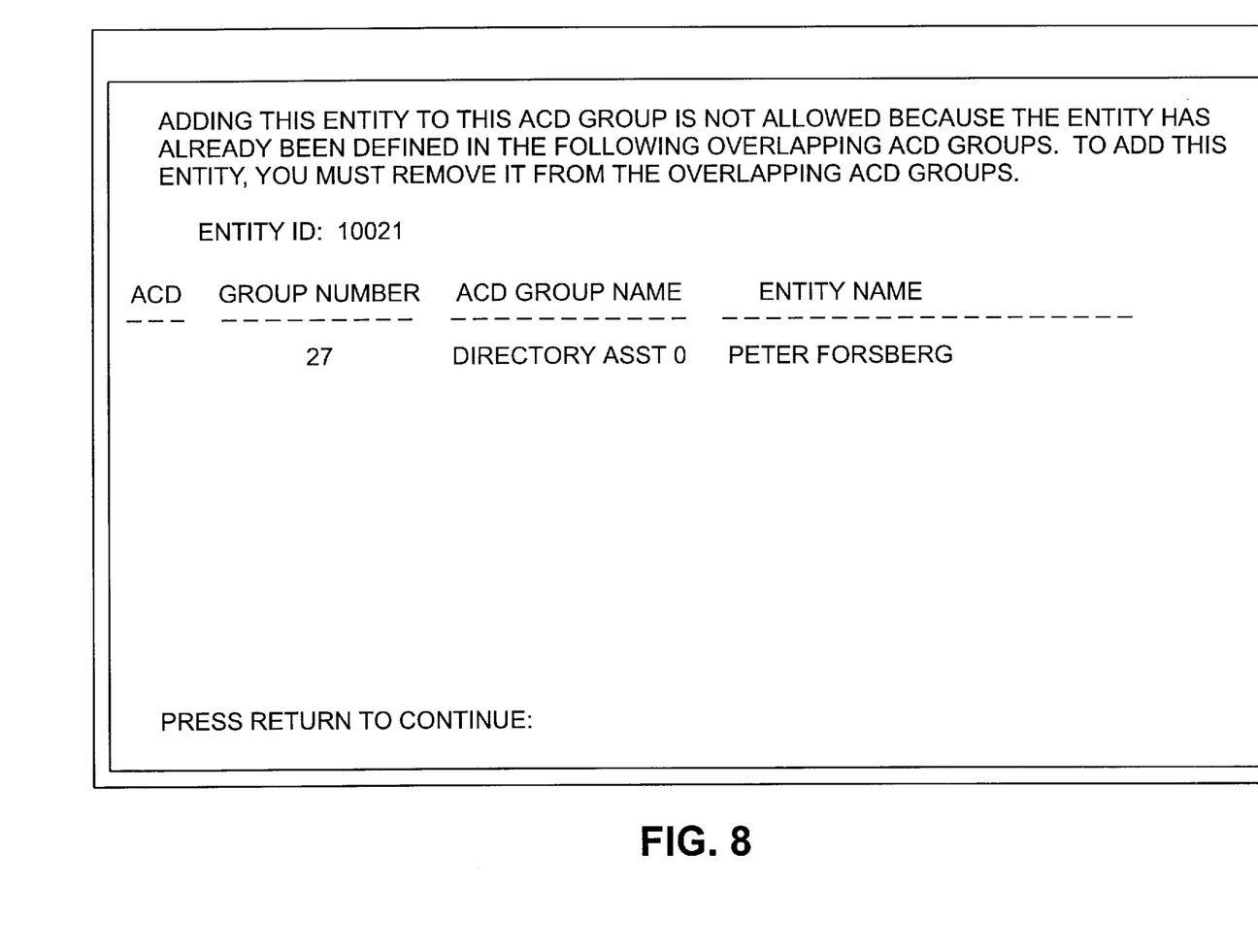
FIG. 8 depicts a graphical user interface according to an embodiment of the present invention.
Figure 9:
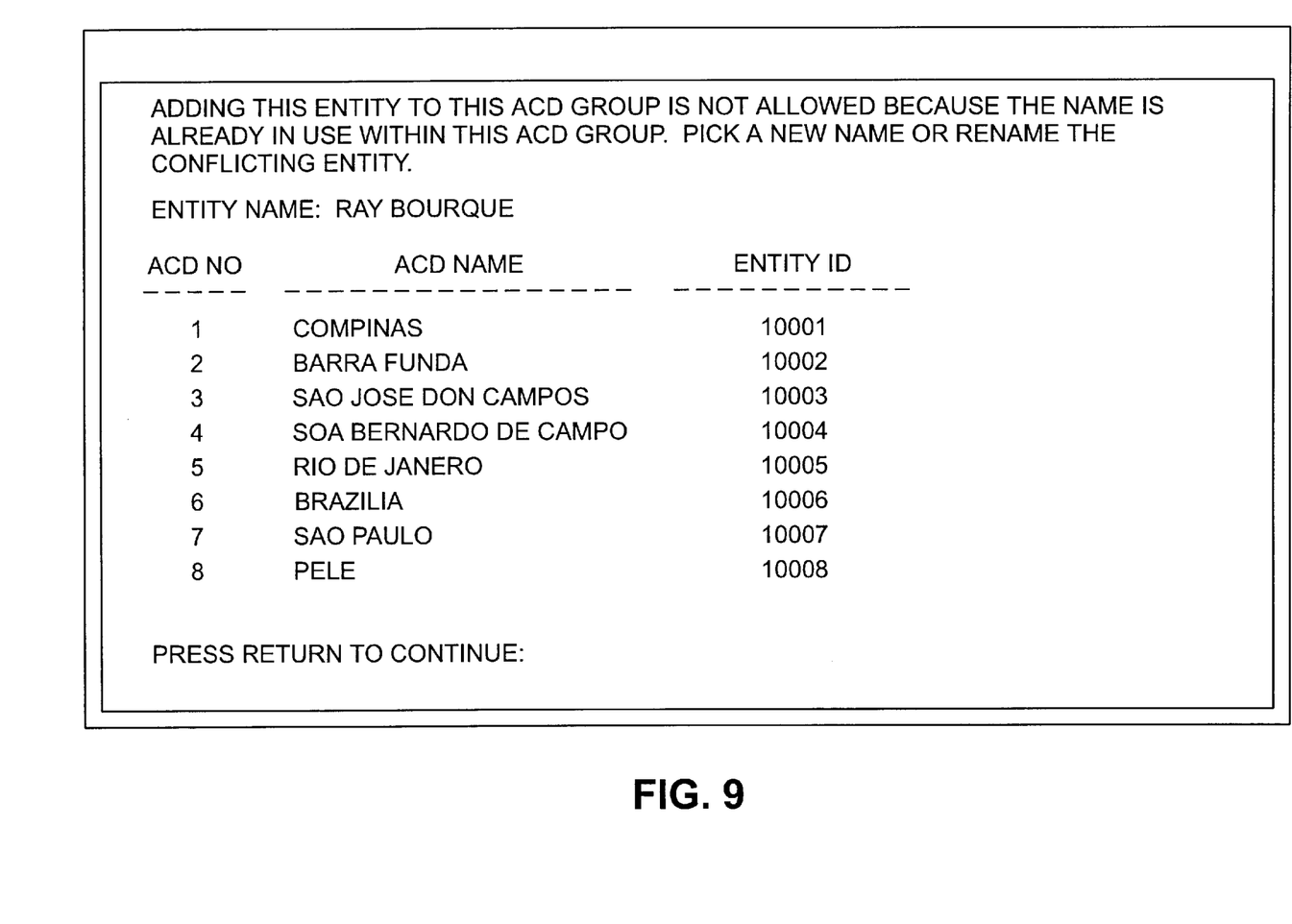
FIG. 9 depicts a graphical user interface according to an embodiment of the present invention.

FIG. 4 depicts the methodology for modifying a synonym associated with an existing ACD group and/or ACD group member. Referring to FIG. 4, the ACD administrator in step 400 receives a command to change an entity. The entity can, for example, be a dictionary field or permission. In step 404, the ACD administrator determines the members of each ACD group affected by the change. The administrator searches through the dictionary, and typically the ACD table in the dictionary, to identify the affected (overlapping) ACD groups. For example, an entity may be associated with a first ACD that is simultaneously included in a plurality of different ACD groups. Each ACD group of which the first ACD is a member is identified. In step 428, the ACD administrator determines whether for any affected ACD group a member of the group overlaps with another ACD group. In other words, the administrator determines if an ACD in the affected group is also in another ACD group. If no overlap exists, the administrator proceeds directly to step 424 (discussed below). If an overlap exists, the administrator proceeds to step 408. In step 408, the ACD administrator determines if an id conflict exists across all overlapping ACD groups. This step mirrors the first axiom noted above. If there is a synonym defined at the ACD group level for the entity id being administered in any of the overlapping ACD groups, entity id overlap exists. If a conflict is identified, the administrator in step 412 instructs the user to resolve the conflict by presenting to the user a graphical interface such as that shown in FIG. 8. If a conflict is not identified, the administrator proceeds to step 416 in which the administrator determines within the selected ACD group whether a name conflict exists for analogous entity types. If there is synonym defined for the entity name being administered for a different entity id on any of the ACDs that are members of the selected ACD group (including the ACD group itself), entity name conflict exists. If so, the administrator in step 412 instructs the user to resolve the conflict by presenting to the user a graphical interface such as that shown in FIG. 9. If not, the administrator proceeds to step 420 and changes the administration for the ACD group consistent with the requested change. The administrator next proceeds to step 424 and propagates the changes associated with the entity to each member ACD in the selected ACD group. The changes in steps 420 and 424 differ in that step 420 is performed at the ACD group (and not ACD) level while the changes in step 424 is performed at the ACD (and the ACD group) level.

The actions performed in steps 420 and 424 vary by application. When an entity synonym is created for an ACD group, synonyms are also created for each ACD that is a member of the ACD group. A synonym record is created in the ACD group dictionary for the ACD group and in the ACD dictionary for each ACD that is a member of the ACD group. Similarly, when an entity synonym is modified (or created if it does not already exist) for an ACD group, the synonym is also modified (or created if it does not already exist) in the ACD group dictionary and the ACD dictionary for each ACD that is a member of the ACD group. When an entity synonym is deleted from an ACD group, the user is presented with an option to also delete the entity synonym from the ACDs that are members of the ACD group. If the user chooses to propagate the action of a deletion, a synonym record is deleted from the dictionaries for the ACD group and for each ACD that is a member of the ACD group. If a user chooses not to propagate the action of a deletion, a synonym record is deleted from the ACD group dictionary only for the ACD group.

In one configuration, a synonym definition propagates downward from the ACD group to member ACDs but not upward from ACDs to the ACD groups that they are members of. The user has the responsibility to resolve synonym inconsistencies that may arise in ACD group reporting when synonym definitions are administered at the single ACD level.

Figure 6:
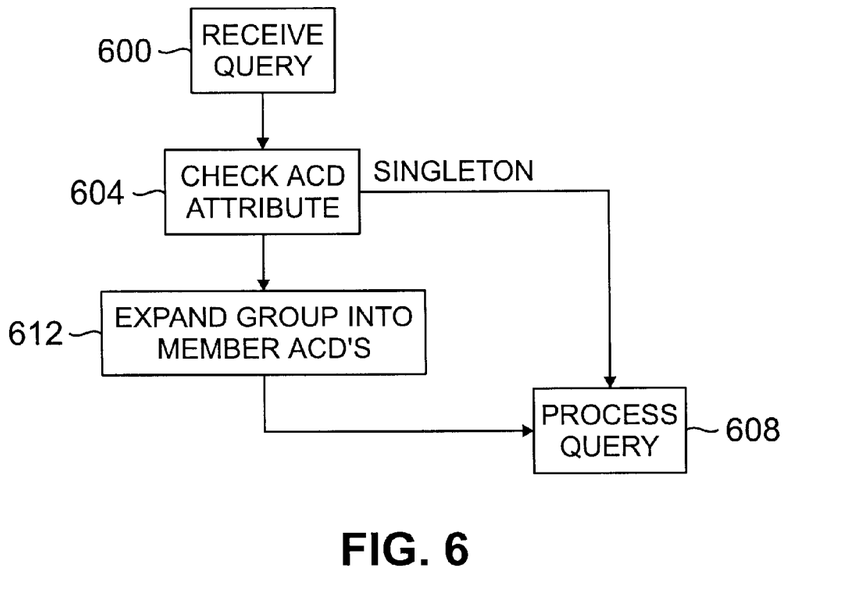
FIG. 6 is a flowchart of the method for retrieving CMS information according to an embodiment of the present invention.

When a CMS realtime or historical report is run for an ACD group, the report's query applies to each ACD that is a member of the ACD group. FIG. 6 shows the algorithm for performing data collection. In step 600, the ACD administrator receives a query for specified information in a CMS database. In step 604, the administrator determines whether the query pertains to only a single ACD or an ACD group by checking the ACD group attribute corresponding to the information requested. The value of the ACD group attribute determines whether the ACD is a singleton (or ungrouped) or in a group. By way of example, if the attribute has a value of 1 to 26, the ACD is a singleton or a value of 27 or greater the ACD is in a group. If the ACD attribute is for a single (ungrouped) ACD, the administrator proceeds to step 608 to process the query. If the ACD attribute is for a grouped ACD, the administrator in step 612 expands the query to refer to all member ACDs in the corresponding ACD group. The administrator then proceeds to step 608 to process the query for each ACD group member and for each ACD group.

To support the aggregation of entity data across ACD boundaries, the CMS realtime database, in one configuration, supports the group by operation for a single column. The group by and order by operations are both supported within a single query. The group by clause combines similar rows, producing a single result for each group of rows that have the same value for the columns listed in the select list.

In one configuration, a flag indicates if a report is for a single ACD, an ACD group, or a hybrid report.

The architecture of the present invention provides an interface for creating CMS user ids. The interface supports assignment of an ACD group as a CMS user's default login ACD. If the ACD group is later deleted, the CMS user's default login ACD reverts to the CMS master ACD. For multi-ACD reporting, CMS supports filtering of permissions by ACD group and entity, in that order. To assign ACD group permissions to a user, a system administrator inputs the user id and ACD group synonym or ACD group number.

To view report data for a CMS entity in any realtime or historical report run when the current ACD is set to an ACD group, the user must have read permissions for the entity at the ACD group level.

A number of variations and modifications of the invention can be used. It would be possible to provide for some features of the invention without providing others. For example in one alternative embodiment, the propagation of additions, changes, and/or deletions can be provided without the aggregation of requested data for ACD groups.

At least one of the ACD group name and ACD group id is an input field. As will be appreciated, one of the fields is commonly an output only field.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A telecommunications system, comprising:
a plurality of telephony switches that receive incoming contacts and route each of the contacts to a corresponding agent;
a management system that interfaces with the plurality of telephony switches and maintains for each of the plurality of telephony switches entity information associated with at least one entity, at least two of the plurality of telephony switches defining a first group of switches, and at least two of the plurality of telephony switches defining a second group of switches, wherein at least one switch is in both of the first and second groups of switches, wherein each of the switches in the first and second switch group is associated with a plurality of entities, wherein each of the plurality of entities is associated with a corresponding entity identifier, and wherein each of the entity identifiers is unique among the entity identifiers in the first and second switch groups, the management system including at least one of the following:
a propagator that propagates automatically at least one of additions to, modifications of, and deletions of entity information associated with each entity to each member of the at least a first group of switches; and
an aggregator that receives queries for the entity information for the at least a first group of switches and retrieves automatically the entity information associated with each member of the at least a first group of switches and/or with the at least a first group of switches.

2. The telecommunications system of claim 1, wherein the first group of switches has at least one unique group identifier, wherein each of the entities associated with each of the switches in the first switch group is associated with the at least one unique group identifier, and wherein each switch has a corresponding queue of contacts to be handled by an agent and an automatic call distributor that manages the corresponding queue.

3. The telecommunications system of claim 1, wherein the management system includes a conflict checker that determines when a conflict exists between the at least one of additions to, modifications of, and deletions of the entity information and existing entity information.

4. The telecommunications system of claim 3, wherein, when a conflict is identified by the conflict checker, the propagator does not automatically propagate the at least one of additions to, modifications of, and deletions of the entity information.

5. The telecommunications system of claim 4, wherein the conflict checker determines when a conflict exists between at least one of an entity identifier and an entity name and an existing at least one of an entity identifier and entity name.

6. The telecommunications system of claim 4, wherein the management system determines when a switch is included in more than one group of switches and wherein the entity information includes user permission to access at least some of the other entity information.

7. A method for managing a multi-switch telecommunication system, comprising the steps of:
receiving a request to at least one of add, delete and modify first information corresponding to at least a first entity, the at least a first entity being associated with at least a first switch, wherein the at least a first entity is included within first and second switch groupings and wherein the first information is at least one of (a) and identity of the first entity and (b) an entity synonym name associated with the first entity;
determining when a conflict exists between the requested change to the first information and at least one of (a) second entity identity and (b) a second entity synonym corresponding to at least a second entity in the first and/or second switch grouping, the at least a second entity being associated with at least a second switch different from the first switch; and
when no conflict is identified in the determining step, making the requested change to the first information.

8. The method of claim 7, wherein a first set of switches defines the first switch grouping and a second set of switches defines the second switch grouping, and further comprising:
identifying each switch in the first and second switch groupings; and
determining whether a switch is in at least two switch groupings.

9. The method of claim 7, wherein the determining step comprises:
determining when a conflict exists between a first identifier associated with the at least a first entity and a second identifier associated with the at least a second entity and wherein the first information includes user permission to access other switch-related information.

10. The method of claim 7, wherein the determining step comprises:

determining when a conflict exists between a first name associated with the at least a first entity and a second name associated with the at least a second entity.

11. The method of claim 7, wherein, when a conflict is identified in the determining step, not making the requested change to the first information.

12. The method of claim 8, wherein each switch in the first and second switch groupings has a respective entity and the making step comprises:

making the requested change to the information corresponding to the respective entity for each switch in the first switch grouping.

13. The method of claim 8, wherein the determining step comprises:

determining when a conflict exists between the requested change and existing information associated with any switch in the first and second groupings of switches.

14. The method of claim 8, wherein each switch in the first and second groupings of switches has a respective entity name and entity id and the entity name and id of each switch in the first and second groupings is different from the entity name and id of the other switches in the first and second groupings.

15. A system for managing a multi-switch telecommunication system, comprising the steps of:

an input for receiving a request to at least one of add, delete and modify at least first entity information related to a first entity, the at least a first entity being associated with at least a first switch, wherein a first set of switches defines a first switch grouping and a second set of switches defines a second switch grouping, wherein the at least a first switch is in the first switch grouping and the second switch grouping, wherein each of the switches in the first and second switch groupings is associated with a plurality of entities, and wherein each of the entities has at least one of a corresponding entity synonym name and entity identifier;

a conflict checker operable to determine when a conflict exists, wherein a conflict exists when different entities in the first and/or second switch groupings have a same at least one of an entity identifier and entity synonym name; and when no conflict is identified by the conflict checker, a propagator operable to make a requested change to the first entity information.

16. The system of claim 15, wherein the conflict checker is operable to identify each switch in the first and second switch groupings; and determine whether a switch is in at least two switch groupings.

17. The system of claim 15, wherein the conflict checker is operable to determine when a conflict exists between a first entity identifier associated with the at least a first entity and a second entity identifier associated with the at least a second entity.

18. The system of claim 15, wherein the at least one of a corresponding entity synonym name and entity identifier is an entity synonym name and wherein the conflict checker is operable to determine when a conflict exists between the first entity synonym name and the second name.

19. The system of claim 15, wherein, when a conflict is identified by the conflict checker, the propagator does not make the requested change to the first information.

20. The system of claim 16, wherein the propagator makes the requested change to first entity information in the first and/or second switch grouping.

21. The system of claim 15, wherein the propagator makes the requested change to the at least a first entity information only for the first switch grouping.

22. The system of claim 16, wherein the conflict checker is operable to determine when a conflict exists between the first entity synonym name and the second entity synonym name.

23. A method for managing a multi-switch telecommunication system, a first set of switches in the system defining a first switch grouping and a second set of switches defining a second grouping, comprising the steps of:

receiving a request for a type of information associated with at least one switch;

determining whether the at least one switch is a member of the first switch grouping;

when the at least one switch is a member of the first switch grouping, retrieving, for each switch in the first switch grouping, information, if any, corresponding to the type of information, wherein the at least one switch is also a member of the second switch grouping, wherein each of the switches in the first and second switch groupings are associated with a plurality of entities, wherein each of the entities corresponds to at least one of an entity synonym name and an entity identifier, and wherein the at least one of an entity synonym name and identifier is unique among the first and second switch groupings.

24. The method of claim 23, further comprising:

receiving a request to at least one of add, delete and modify at least a first entity, the at least a first entity being associated with at least a first switch;

determining when at least two entities in the first and/or second switch groupings have a same at least one of an entity identifier and entity synonym name; and when at least two entities in the first and/or second switch groupings do not have a same at least one of an entity identifier and entity synonym name, making the requested change to the at least a first entity.

25. The method of claim 24, further comprising:

identifying each switch in the first and second switch groupings; and determining whether a switch is in at least two switch groupings.

26. The method of claim 24, wherein the at least one of an entity synonym name and an entity identifier is an entity identifier and wherein the second determining step comprises:

determining when a conflict exists between a first identifier associated with the at least a first entity and a second identifier associated with the at least a second entity.

27. The method of claim 24, wherein the at least one of an entity synonym name and an entity identifier is an entity synonym name and wherein the second determining step comprises:

determining when a conflict exists between a first synonym name associated with the at least a first entity and a second synonym name associated with the at least a second entity.

28. The method of claim 24, wherein, when a conflict is identified in the conflict determining step, not making the requested change to the at least a first entity.

29. The method of claim 25, wherein the making step comprises:

making the requested change to the at least a first entity for each switch in the first switch grouping.

30. The method of claim 29, wherein the making step comprises:
    making the requested change to the at least a first entity for the first switch grouping.

31. The method of claim 25, wherein each switch in the first and second groupings of switches has a respective entity identifier and the entity identifier of each switch in the first and second groupings is different from the entity identifier of the other switches in the first and second groupings.

32. A system for managing a multi-switch telecommunication system, a first set of switches in the system defining a first switch grouping and a second set of switches defining a second switch grouping, wherein at least one switch is in both of the first and second switch groupings, wherein each of the switches in the first and second switch groupings is associated with a plurality of entities, and wherein each of the entities has a corresponding at least one of an entity synonym name and entity identifier, comprising:
    an input for receiving a request for a type of information associated with the at least one switch, the type of information being associated with at least one of a first entity name and first synonym name corresponding to a first entity;
    a conflict checker operable to determine whether the at least one switch is a member of the first switch grouping and whether the at least one of a first entity name first synonym name conflicts with at least one of the entity name and synonym name of at least a second entity in the first and second switch groupings;
    when the at least one switch is a member of the first switch grouping and when no conflict exists with the at least one of an entity name and synonym name of the at least a second entity, an aggregator operable to retrieve, for each switch in the first switch grouping, information, if any, corresponding to the type of information.

33. The system of claim 32, wherein the input receives a request to at least one of add, delete and modify at least a first entity, the at least a first entity being associated with at least a first switch and
    wherein the conflict checker determines that no conflict exists; and further comprising:
        a propagator operable to make the requested change to the at least a first entity.

34. The method of claim 33, wherein a second set of switches defines a second switch grouping, and
    wherein the conflict checker is operable to identify each switch in the first and second switch groupings; and
    whether a switch is in at least two switch groupings.

35. The system of claim 33, wherein the conflict checker determines when a conflict exists between a first identifier associated with the at least a first entity and a second identifier associated with the at least a second entity.

36. The system of claim 33, wherein the at least one of an entity synonym name and entity identifier is a synonym name and wherein the conflict checker determines when a conflict exists between a first synonym name associated with the at least a first entity and a second synonym name associated with the at least a second entity.

37. The system of claim 33, wherein, when a conflict is identified by the conflict checker, the propagator does not make the requested change to the at least a first entity.

38. The system of claim 34, wherein the propagator makes the requested change to the at least a first entity for each switch in the first switch grouping.

39. The system of claim 38, wherein the propagator makes the requested change to the at least a first entity for the first switch grouping.

40. The system of claim 38, wherein each switch in the first and second groupings of switches has a respective entity identifier and the entity identifier of each switch in the first and second groupings is different from the entity identifier of the other switches in the first and second groupings.

41. A memory of a management system for a multi-switch telecommunications system, comprising:
    a first switch grouping attribute associated with a first grouping of switches; and
    a second switch grouping attribute associated with a second grouping of switches, wherein the first and second switch groupings have at least one switch in common, wherein the first switch grouping attribute requires a switch associated with the first switch grouping attribute to be in the first switch grouping, wherein the second switch grouping attribute requires a switch associated with the second switch grouping attribute to be in the second switch grouping, wherein each of the switches in the first and second switch groupings corresponds to a plurality entities, wherein each entity has at least one of an entity name and a synonym name, and wherein the at least one of an entity name and synonym name of a first entity associated with the common switch is unique among the at least one of an entity name and synonym name of each entity associated with a switch in the first and second switch groupings.

42. The memory of claim 41, wherein the second grouping of switches is different from the first grouping of switches, and wherein each of the first and second switch grouping attributes corresponds to at least one of a group name and a group identifier.

43. The memory of claim 41, wherein each of the first and second groupings each comprise a plurality of switches, each switch in the first and second groupings being associated in memory with a respective plurality of entities.

44. The memory of claim 43, wherein the respective plurality of entities include at least two of agent, split/skill, trunk, trunk group, vector directory number, and vector.

45. The telecommunications system of claim 1, wherein at least one switch in the first and second groups of switches is different.

46. The telecommunications system of claim 1, wherein the plurality of entities associated with the at least one switch comprise first and second sets of entities, wherein the first set of entities is in the first switch group and the second set of entities is in the second switch group, and wherein the first and second sets of entities are disjoint.

47. The telecommunications system of claim 46, wherein the entities in the first and second sets of entities are of the same type, with the type being one of agent, split/skill, trunk, trunk group, vector directory number, and vector.

48. The method of claim 7, wherein a first set of entities associated with the first switch is included within the first switch grouping and a second set of entities associated with the first switch is included within the second switch grouping and wherein the first and second sets are disjoint.

49. The method of claim 48, wherein entities in the first and second sets are of the same type, with the type being one of agent, split/skill, trunk, trunk group, vector directory number, and vector.

50. The memory of claim 41, wherein at least one switch in the first and second groups of switches is different.

51. The method of claim 7, wherein the at least one of(a) an identity of the first entity end (b) an entity synonym name associated with the first entity is the first entity identity and the at least one of(a) a second entity identity and (b) a second entity synonym is a second entity identity.

52. The method of claim 7, wherein the at least one of (a) the first entity identity and (b) an entity synonym name associated with the first entity is the first entity synonym name and the at least one of (a) a second entity identity and (b) a second entity synonym is the second entity synonym name.

53. The telecommunications system of claim 1, wherein each of the plurality of entities is associated with at least one entity synonym name and wherein the entity synonym names are unique among the first and second switch groups.

54. The memory of claim 41, wherein the at least one of an entity name and a synonym name is an entity name.

55. The memory of claim 41, wherein the at least one of an entity name and a synonym name is a synonym name.

\* \* \* \* \*